W. A. E. HENRICI.
FRICTION CLUTCH
APPLICATION FILED JAN. 25, 1908
935,909. Patented Oct. 5, 1909.
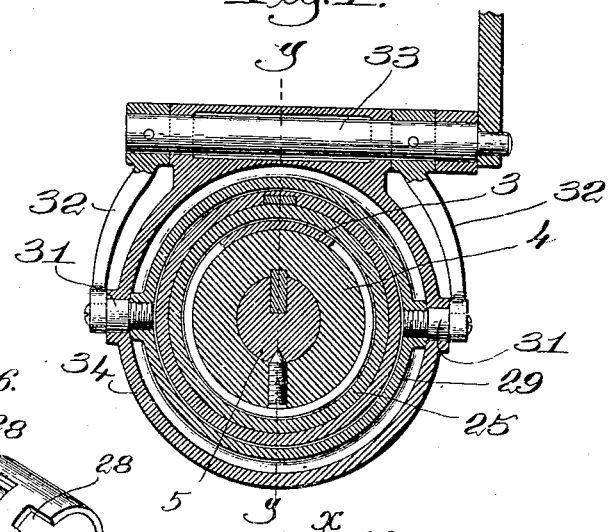
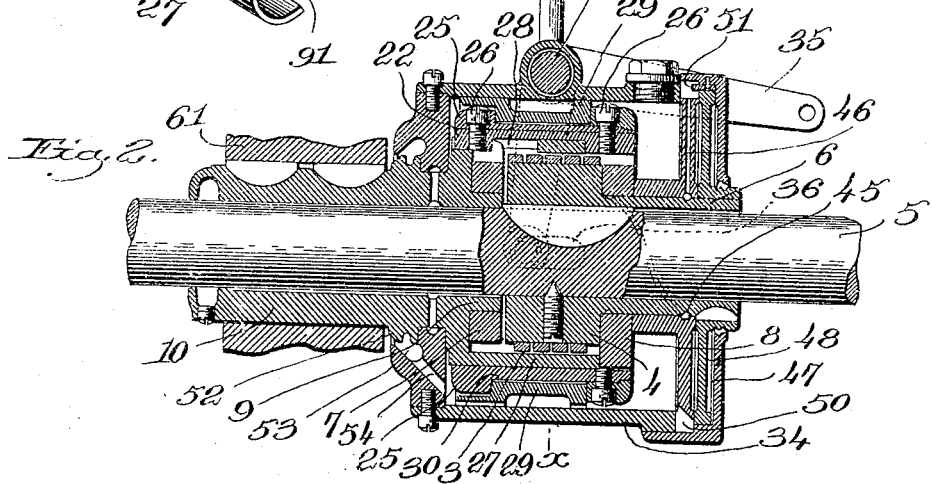
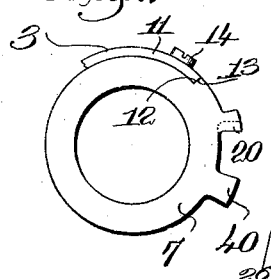 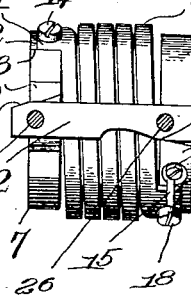 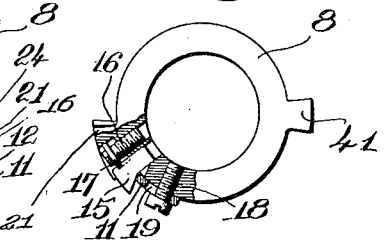
Witnesses.
Thomas J. Drummond
Joseph M. Ward
Inventor.
William A. E. Henrici,
by Busby Gregory, attys.

UNITED STATES PATENT OFFICE.

WILLIAM A. E. HENRICI, OF BOSTON, MASSACHUSETTS, ASSIGNOR, BY MESNE ASSIGNMENTS, TO LIBERTY TRUST COMPANY, TRUSTEE, OF BOSTON, MASSACHUSETTS, A CORPORATION OF MASSACHUSETTS.

FRICTION-CLUTCH.

935,909.        Specification of Letters Patent.        Patented Oct. 5, 1909.

Application filed January 25, 1908. Serial No. 412,534.

*To all whom it may concern:*

Be it known that I, WILLIAM A. E. HENRICI, a citizen of the United States, and a resident of Boston, in the county of Suffolk and State of Massachusetts, have invented an Improvement in Friction-Clutches, of which the following description, in connection with the accompanying drawing, is a specification, like numerals on the drawing representing like parts.

This invention relates to friction clutches of that type embodying a friction coil which encircles a drum or other friction surface.

The invention is especially designed as an improvement on the clutch shown and described in my Patent No. 840,847, dated January 8, 1907. The clutch shown in said patent comprises a friction coil which encircles a friction drum and which is connected at each end to a collar. The clutch is operated by a device arranged to turn the collars in opposite directions thereby tightening the coil about the drum.

In my present invention I have improved this type of clutch by providing a novel way of mounting the collars to which the ends of the coil are connected; by providing an adjustable connection between the coil and one of the collars so that the length of the coil may be adjusted to compensate for wear; by providing a novel construction whereby the parts having rubbing contact with each other are lubricated; by inclosing the active members of the clutch in a casing which not only protects the parts from dust but also serves as a means to catch and retain the oil used in lubricating the clutch and thus prevent said oil from being thrown off from the clutch by centrifugal action and by improving in other ways the general construction of the clutch.

In the drawings wherein I have shown one embodiment of my invention, Figure 1 is a section on substantially the line *x—x*, Fig. 2; Fig. 2 is a section on substantially the line *y—y*, Fig. 1; Fig. 3 is a view of the friction coil and the collars detached; Fig. 4 is a side view of one of the collars; Fig. 5 is a side view of the other collar, said view showing the collar partly in section; Fig. 6 is a perspective view of the shell of the driving member of the clutch.

The two clutch members are the friction coil 3 and the hub or drum 4 about which the coil is encircled, and the clutch is engaged by tightening the coil about the drum. Either the coil or the drum may constitute the driving member of the clutch but as herein represented the coil 3 is the driving member and the drum 4 the driven member. Said drum is shown as keyed to a shaft 5 and as provided with a sleeve or hub 6. The coil has secured at each end thereof a collar, said collars being designated 7 and 8 respectively.

The collar 8 is shown as loosely mounted on the sleeve 6 of the driven member of the clutch, and the collar 7 is shown as mounted on the hub 9 of the driving element 10, said driving element being loosely mounted on the shaft 5 and having a hub to which a driving pulley or driving gear 61 may be keyed. Each end of the coil is offset, as at 11, to form a shoulder 12, and each shoulder 12 engages a coöperating shoulder formed on the collar.

The shoulder on the collar 7 is designated 13 and the manner in which the shoulders 12 and 13 engage each other is plainly seen from Figs. 3 and 4. The offset end of the coil is secured to the collar 7 by means of a suitable screw 14.

The shoulder on the collar 8 with which the end of the coil 3 engages is made adjustable so that the length of the coil may be increased or decreased. This may be provided for by making said collar 8 with the adjustable wedge member 15, the wedge surface of which engages the shoulder 12 formed on the coil 3.

The wedge member is mounted for adjustment radially which may be conveniently done by providing the adjusting screw 16 which is screw-threaded into the collar 8 and which is provided with the flange 17 that enters a notch formed in the wedge member 15. By adjusting the screw 16 the wedge member 17 is moved out or in and the friction coil is consequently adjusted relative to the collar 8. The offset portion 11 at said end of the coil is shown as secured to the collar by means of a screw 18 which extends through a slot 19 in said end. This slot permits the end of the coil to be shifted relative to the collar 8 by the adjustment of the wedge 15.

The two collars 7 and 8 are provided with the cam projections 20 and 21. Said cam projections are adapted to be engaged by an actuator 22 which is provided with the two cam surfaces 23 and 24.

When the actuator is moved toward the right, Fig. 3, said collars are permitted to turn relative to each other in a direction to allow the friction coils to unwind slightly. The movement of the actuator into the position shown in Fig. 3 however turns the collars relative to each other in a direction to tighten the coil and thus clutch it to the member 4.

The means for operating the actuator 22 herein shown is somewhat similar to that shown in my patent. Said actuator is secured to a sleeve 25 by means of two screws 26. This sleeve 25 encircles the barrel or shell 27 which forms part of the driving element 10 and which in turn incloses the friction coil 3 and the drum 4, as plainly seen in Fig. 2.

The actuator 22 is situated outside of the barrel or shell 27 but the latter is provided with openings 28 through which the projections 20 and 21 extend so that said projections are in position to be acted on by the cam surfaces of the actuator.

The sleeve 25 is encircled by a clutch-actuating sleeve 29. Said sleeve 29 is shaped to fit into a peripheral groove 30 formed in the sleeve 25, whereby the sleeve 25 is permitted to rotate within the sleeve 29 but the two sleeves are connected together for movement longitudinally of the shaft.

The clutch-actuating sleeve 29 has secured thereto by means of pins 31 two arms 32 rigid with the rock-shaft 33. This rock-shaft is shown as journaled in bearings formed in a stationary casing 34 which incloses the operative parts of the clutch, and which is provided with two slots 36 through which the pins 31 pass. The turning of the rock shaft 33 operates to shift the sleeve 29 longitudinally of the shaft, and said sleeve 29 gives a similar movement to the sleeve 25. Since the actuator 22 is rigidly secured to the sleeve 25 the movement of said sleeve shifts the actuator and thus clutches or releases the clutch as will be obvious.

Assuming that the member 10 is a driving element and is constantly rotating it will be seen that when the clutch is released the shaft 5 and the drum 4 will be stationary and that said member 10 with the collars 7 and 8, the coil 3 and the sleeve 25 are rotating.

The rotation of the member 10 is communicated to the collars 7 and 8 and thus to the coil 3 and sleeve 25 by reason of the fact that said collars are provided with projections 40 and 41 which are received in openings 28 and 91 formed in the barrel 27. A clutch thus made is very compact and easily operated.

If it is found that the clutch is not set tight enough by the ordinary movement of the rock shaft 33, the wedge member 15 may be adjusted to tighten the coil slightly which will result in causing the clutch members to be brought into engagement by a less movement of the rock shaft.

It will be noted that the collar 7 is mounted on the driving element 10 while the collar 8 is mounted on the driven member of the clutch. When, therefore, the clutch is released the collar 8 will be rotating about the driven clutch member 4, and to prevent undue friction between these parts I have provided means for oiling the contacting surfaces and keeping them oiled.

As herein shown the sleeve portion 6 is provided with a spirally arranged oil groove 45 which communicates with an oil duct 46 formed in the stationary casing 34. Said casing also has an oil-receiving chamber 47 within which is situated a rotating member or disk 48, said disk being keyed to the sleeve 6. The chamber 47 has communication with the interior of the casing through a passage 50 so that any oil which is introduced into the casing for oiling the parts will gravitate to the passage 50 and be picked up by the disk 48 when the clutch is in operation. The oil which is thus picked up by the periphery of the disk is scraped therefrom by the scraper 51 and drops from the latter back into the oil duct 46 from which it passes to the oil groove 45. By means of this construction the parts of the clutch which have rubbing contact with each other are automatically kept oiled.

The driving element 10 is provided with the circumferential ribs 52 which are received in a chamber 53 formed in the casing so that any oil which tends to work out from the casing having the contacting surfaces between the member 10 and the casing is thrown from these ribs by centrifugal action into the chamber 9 from which it drains to the interior of the casing through the duct 54.

It will be noted that all the active parts of the clutch are completely inclosed in the casing 34 so that there is no danger of anything getting caught in the clutch. Furthermore, this casing has such a construction as to thoroughly protect the working parts from dust and dirt and to prevent any oil from being thrown off from the clutch. This feature has the advantage that it permits the clutch to be used in any location without any danger that there will be any dripping of oil from the clutch.

Having described my invention what I claim as new and desire to secure by Letters Patent is:—

1. In a clutch, the combination with a friction drum and a friction coil encircling said drum, of a collar secured to one end of said coil, a second collar secured to the other end of said coil, a wedge member adjustably carried by said second collar and engaging the coil, and means to turn the collars in opposite directions thereby to tighten the coil about the friction drum.

2. In a clutch, the combination with a friction drum and a friction coil surrounding the drum, said coil having a shoulder at each end, of two collars one having a shoulder to engage the shoulder at one end of the coil, a wedge member adjustable radially of the other collar and engaging the shoulder at the other end of the coil, and means to turn the collars in opposite directions thereby to tighten the coil about the drum.

3. In a clutch, the combination with a drum, of a friction coil encircling said drum, a collar loosely mounted on the drum and secured at one end of the coil, a second collar mounted independently of the drum and secured at the other end of the coil, and means to turn the collars relative to each other thereby to tighten the coil about the drum.

4. In a friction clutch, the combination with a drum having a friction surface, of a coil encircling said drum, a collar loosely mounted on the drum and connected to one end of the coil, a driving element having a barrel inclosing the coil, a second collar loosely mounted on said driving element and connected to the other member of the coil, and means to turn the collars in opposite directions thereby to tighten the coil about the drum.

5. In a friction clutch, the combination with a drum having a friction surface, of a coil encircling said drum, a collar loosely mounted on the drum and connected to one end of the coil, a driving element having a barrel inclosing the coil, a second collar loosely mounted on said driving element and connected to the other member of the coil, a sleeve encircling the barrel and rotatable therewith but movable longitudinally thereof, a second non-rotatable sleeve encircling the first named sleeve, said sleeves being connected for movement longitudinally of the shaft, and means carried by the rotatable sleeve to turn the collars in opposite directions when said sleeve is moved longitudinally.

6. In a friction clutch, the combination with a drum having a friction surface, of a coil encircling said drum, a collar loosely mounted on the drum and connected to one end of the coil, a driving element having a barrel inclosing the coil, a second collar loosely mounted on said driving element and connected to the other member of the coil, a sleeve encircling the barrel and rotatable therewith but movable longitudinally thereof, a second non-rotatable sleeve encircling the first named sleeve, said sleeves being connected for movement longitudinally of the shaft, and means carried by the rotatable sleeve to turn the collars in opposite directions when said sleeve is moved longitudinally, and a stationary casing inclosing the above-mentioned parts.

7. In a clutch, the combination with a drum, of a friction coil surrounding said drum, a collar loosely mounted on the drum and connected to one end of said coil, a second collar connected to the other end of said coil, means to turn said collars in opposite directions thereby to tighten the coil about the drum, a casing within which said parts are located, and means within the casing and operated by the rotation of the drum to lubricate the contacting surfaces between said drum and collar.

8. In a clutch, the combination with a drum, of a friction coil surrounding the drum, a collar loosely mounted on the drum and connected to one end of the coil, a second collar connected to the other end of the coil, means to turn said collars in opposite directions thereby to tighten the coil about the drum, a stationary casing having two communicating chambers in one of which the above-named parts are located, and means in the other chamber operated by the rotation of the drum to deliver oil to the contacting surfaces between said drum and collar.

9. In a clutch, the combination with a drum, of a friction coil surrounding the drum, a collar loosely mounted on the drum and connected to one end of said coil, a second collar connected to the other end of said coil, means to turn the collars in opposite directions thereby to tighten the coil about the drum, said drum having an oil duct therein leading to the surface between it and the collar, a casing within which said parts are located, and means operated by the rotation of the drum to deliver oil to said duct.

10. In a friction clutch, the combination with a drum, of a coil encircling said drum, two loosely mounted collars connected to the ends of the coil, a sleeve encircling said coil and carrying means to move the collars in opposite directions, a stationary casing inclosing the operative parts of the clutch, a rock shaft mounted on said casing, means to shift the sleeve longitudinally by turning movement of the rock shaft.

In testimony whereof, I have signed my name to this specification, in the presence of two subscribing witnesses.

WILLIAM A. E. HENRICI.

Witnesses:
MARGARET A. DUNN,
LOUIS C. SMITH.